UNITED STATES PATENT OFFICE.

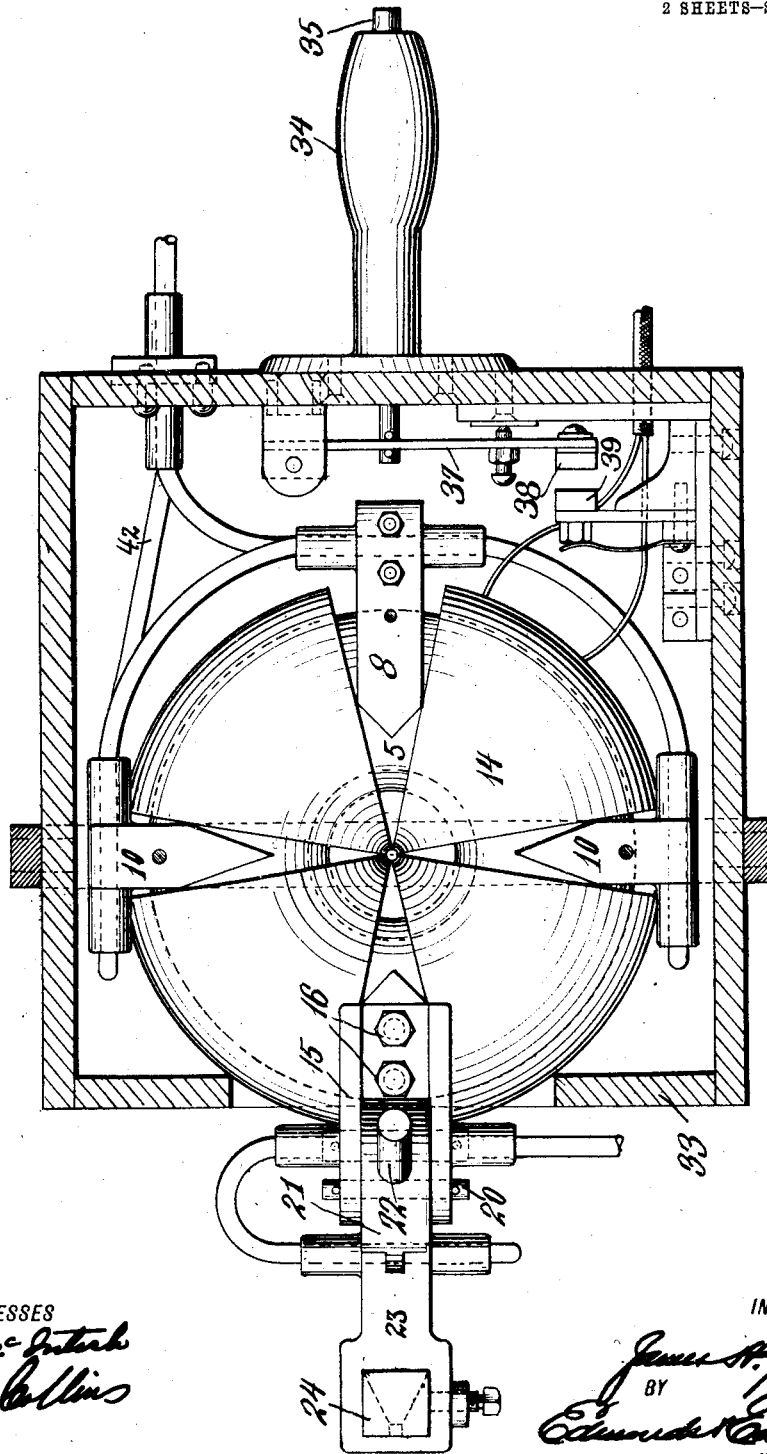

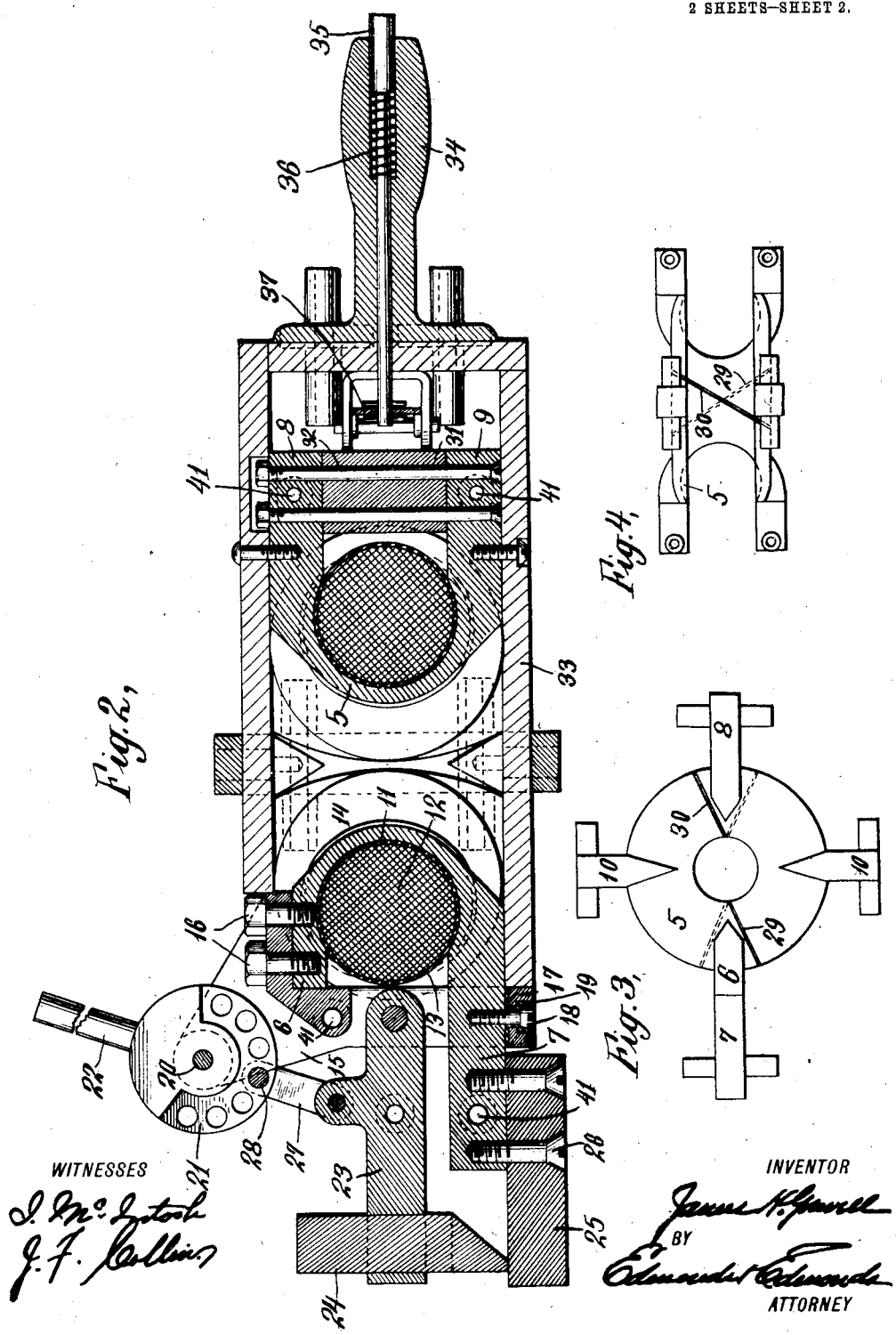

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING-MACHINE.

1,084,083.  Specification of Letters Patent.  Patented Jan. 13, 1914.

Application filed February 24, 1913. Serial No. 750,059.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to electric welding machines and is directed to the provision of a machine of this character of an improved construction, the improvements being of particular utility in the construction of a machine of such small size and weight compared to its capacity as to render the machine portable.

In electric welding operations it has been usual heretofore to manipulate the work rather than the machine while making a series of welds, but in many cases the work or one or more of the parts thereof are of such weight or bulk as to permit of their manipulation only with great difficulty. In operating on such parts, it would be far more convenient to move the machine if the latter could be made of small size and weight.

The present invention involves the provision of a machine so constructed as to be of very small size and therefore portable.

One feature of the invention involves the use of the secondary of the transformer as the frame of the machine about which the several parts of the machine are grouped and upon which they are mounted. This secondary is preferably a casting of copper and is of annular form and the core therefor is preferably a winding of wire, this wire being wound on the secondary but insulated therefrom. The primary coil is wound on the secondary and core, it consisting of a multiplicity of convolutions each passing through the annular secondary.

Another feature of the invention involves so constructing the secondary as to provide for two or more turns in the secondary coil. This is accomplished by making the secondary in two or more parts and connecting together two adjacent parts by means of a connecting member which lies on the side of the core opposite the secondary itself.

These and other features of the invention are set forth fully in the following description of a form of machine which embodies the invention, this machine being illustrated in the accompanying drawings.

In these drawings, Figure 1 is a plan view of the machine with the inclosing casing in section. Fig. 2 is a transverse sectional view of the machine and Figs. 3 and 4 are top and side views of the secondary of the transformer.

Referring to these drawings, the secondary of the transformer is shown at 5 and this secondary constitutes the frame upon which the parts of the machine are assembled. This secondary is a casting of copper and is of annular shape as shown in Fig. 3. The cross-sectional shape of this casting is illustrated in Fig. 2, from which it appears that the casting has the cross-sectional shape of approximately two thirds of a tube. On one side the casting 5 has a lug 6 formed integral therewith. Directly below the lug 6, the secondary casting has a lug 7 formed integral therewith and extended a substantial distance beyond the lug 6. Directly opposite the lugs 6 and 7, two lugs 8 and 9 are formed integral with the secondary casting 5. Between these two pairs of lugs, other pairs of lugs 10 integral with the secondary casting may be provided for use in cooling the apparatus as hereinafter described. The secondary casting shaped as thus described and cut as hereinafter set forth, has insulating material 11 applied thereto over its outer curved surface, that is, over the semi-circular concave surface on the exterior of the annulus forming the secondary. This having been done, the core 12 is applied to the secondary 5. This core consists of a winding of wire. In forming this core, wire is wound around the secondary 5 in the concave circumferential groove thereof until a core 12 is built up circular in cross-section and of a diameter equal to the diameter of the concave depression in the exterior of the annular secondary. Insulating material 13 is then applied to the outer surface of the core 12.

The primary coils of the transformer consist of wire wound around the secondary and core made as above set forth. These primary coils are shown at 14 in Figs. 1 and 2 from which it will be seen that they are built up in the form of sectors of a circle, each convolution of the wire passing through the opening in the annular secondary.

The welding terminals are secured to the lugs 6 and 7. For this purpose a frame or casting 15 is secured by bolts 16 to the lug 6. This frame 15 is extended downwardly and provided with a portion 17, which extends under the lug 7 and is secured to the lug 7 by means of a bolt 18. This portion 17 is, however, insulated from the lug 7 and screw 18 by suitable insulating material as shown as 19. The frame 15 is provided with upwardly extending wings in which are formed bearings for a short shaft 20 on which a disk 21 is adapted to rotate. Disk 21 has an operating handle 22 secured thereto. A welding conductor or terminal 23 is pivotally mounted at one end upon the frame 15 and between the side members thereof and at its opposite end is adapted to have a welding tool 24 secured thereto. The opposite terminal of the machine consists of a bar 25 secured by screws 26 to the lug 7. A link 27 is pivotally connected to the terminal 23 at one end and is adapted to have the opposite end connected by means of a stud 28 to the disk 21. This disk is provided with a plurality of openings into any one of which the stud 28 may be inserted in adjusting the machine for different kinds of work.

The secondary casting 5 is so constructed as to form two turns or convolutions about the core 12. This is effected by making the secondary 5, constructed as above set forth, in two or more parts. This can be most conveniently done by casting the secondary in one part and afterward cutting it in a predetermined manner. One of these cuts is indicated at 29 in Figs. 3 and 4. This cut extends entirely through the secondary casting 5 and is inclined in such a manner that the lugs 6 and 7, which lie one directly above the other, are on opposite sides of the cut. A similar inclined cut is made through the secondary casting 5 at a diametrically opposite point, as indicated at 30 in Fig. 3. This cut is such that the lugs 8 and 9, which lie one directly above the other, are on opposite sides of the cut. Also, these cuts are so disposed that the lugs 6 and 9 are integral with one part of the secondary and the lugs 7 and 8 are integral with the other part. The lugs 8 and 9 are electrically connected by a connecting member 31 lying outside the core 12. This connecting member 31 and the lugs 8 and 9 are secured together by means of bolts 32. This construction is such that the secondary current flows from the lug 6 half way around the annular secondary 5 to the lug 9, then through the connecting member 31 to the lug 8, then half way around the annular secondary to the lug 7, then through the parts 25, 24, 23 and 15 and the parts to be welded together to the lug 6. It will be seen that the secondary current in flowing over this path makes two turns around the core 12.

The apparatus thus constructed is preferably inclosed within a casing 33 of non-metallic material. Such a casing of rectangular form is shown in the drawings, the parts thereof being secured to the secondary casting 5. The lug 7 and the frame 15 and the parts mounted thereon extend through one end of this casing. The other end of the casing has an operating handle 34 secured thereto. An operating member 35 of a switch in the primary circuit extends through this handle 34 and is normally pressed outwardly by a spring 36. The opposite end of the member 35 is connected to a switch arm 37 carrying a contact 38 adapted to engage a contact 39 connected to the primary coils to open and close the primary circuit of the transformer.

The several lugs 7, 8, 9 and 10 and the frame 15 are provided with openings therethrough, as shown at 41 in Fig. 2 and in dotted lines in Fig. 1, for a cooling agent, such as water, whereby the temperature of the secondary may be maintained at a sufficiently low point. These tubular openings may be connected together by tubes 42, which pass through the casing of the machine, these connections carrying the water of a suitable circulating system, whereby the secondary winding is cooled.

In the operation of the machine the handle 22 is turned to raise the tool 24 and the parts to be welded are then assembled between the tool 24 and bar 25; then by raising the handle 22 the tool 24 may be turned about its pivotal connection to the frame 15 and forced into hard contact with the work. The operator then presses the end of the member 35 so as to close the primary circuit, whereupon the welding current flows in the secondary circuit. The path of this secondary current is such that the current flows twice around the core 12, completing the turn once through the conducting member 31 and the second time through the work and the terminals of the machine. If parts of different thickness are to be welded together a change is made in the connection of link 27 to disk 21.

By reason of the construction of the machine as herein set forth, the dimensions and weight of the machine may be made very small by comparison with other machines of similar capacity. This small size is due largely to the construction of the secondary and the core in the manner above described and the winding of the primary coil directly upon this combined secondary and core. The cutting of the casting for the secondary coil as above set forth, thus requiring the secondary current to flow in a path making two turns about the core, also contributes to the reduction in the size of the machine. If desired, more turns in the secondary circuit may be provided for by making additional cuts through the secondary casting and arranging additional conducting members 31 in the manner shown. The use of the secondary as a frame-work upon which to build up the machine also contributes to the small size of the machine and the compact arrangement of the parts thereof.

Having described my invention, what I claim as new therein and desire to secure by Letters Patent of the United States is:

1. A portable welding machine comprising the combination of a secondary coil constituting the frame of the machine, supporting devices for the machine secured to said coil, and a primary coil, a core and terminals connected to the secondary coil all mounted on the secondary coil, substantially as set forth.

2. In a welding machine, the combination of a secondary coil constituting the frame of the machine, supporting devices for the machine secured to said coil, a primary coil and a core mounted on the secondary coil, terminals mounted on the secondary coil and connected thereto and means mounted on the secondary coil for moving the terminals toward and away from each other, substantially as set forth.

3. In a welding machine, the combination of a secondary coil shaped to inclose a core, a core located therein, a primary coil encircling the secondary and core and terminals connected to the secondary coil and movable toward and away from each other, substantially as set forth.

4. In a welding machine, the combination of a secondary coil shaped to inclose a core, a core located therein, a primary coil encircling the secondary and core, terminals mounted on the secondary and connected thereto and means mounted on the secondary for moving the terminals toward and away from each other, substantially as set forth.

5. In a welding machine, the combination of an annular secondary coil, a core adjacent thereto, a primary coil inclosing the secondary and core and terminals connected to the secondary coil and movable toward and away from each other, substantially as set forth.

6. In a welding machine, the combination of an annular secondary coil shaped to inclose a core, a core inclosed thereby, a primary coil inclosing the core and secondary coil, terminals mounted on and connected to the secondary and means for moving the terminals toward and away from each other, substantially as set forth.

7. In a welding machine, the combination of an annular secondary coil, a core consisting of wire wound on the secondary, a primary coil wound on the core and secondary, terminals mounted on and connected to the secondary and means for moving the terminals toward and away from each other, substantially as set forth.

8. In a welding machine, the combination of a secondary coil consisting of an annular secondary coil, a core consisting of wire wound on and partially inclosed by the secondary coil, a primary coil encircling the core and secondary coil, terminals mounted on the secondary coil and electrically connected thereto and means for moving the terminals toward and away from each other, substantially as set forth.

9. In a welding machine, the combination of a secondary coil, integral lugs thereon at points intermediate the terminals having openings therethrough for a cooling medium, a primary coil and core associated with the secondary coil, connections to said openings for carrying the cooling medium and terminals connected to the secondary coil and movable toward and away from each other, substantially as set forth.

10. In a welding machine, the combination of a secondary coil and a core in cooperative relation thereto, a primary coil wound thereon, the windings of the primary coil passing through the secondary coil and core, and terminals connected to the secondary coil and movable toward and away from each other, substantially as set forth.

11. In a welding machine, an annular secondary coil having the continuity thereof interrupted at one point by a cut across one side of the coil, an annular core adjacent to the coil and a connecting member forming part of the secondary circuit, said member being connected to the secondary coil on opposite sides of the said cut therein and forming with said coil one turn about said core, substantially as set forth.

12. In a welding machine, an annular secondary coil having a cut across one side of the same the ends of which cut are displaced circumferentially of the coil, terminals connected to the coil on opposite sides of the cut and arranged one above the other in a line substantially parallel to the axis of the coil, and means for moving the terminals toward and away from each other, substantially as set forth.

13. In a welding machine, a secondary formed in two parts, a core associated therewith, a connecting member connected to said parts and lying on the opposite side of the core therefrom, and terminals each connected to one of said parts and one of them movable toward and away from the other, substantially as set forth.

14. In a welding machine, an annular secondary formed in two parts, an annular core associated therewith, a connecting member connected to said parts and lying on the side of the core opposite therefrom and two terminals each connected to one of said parts and movable toward and away from each other, substantially as set forth.

15. In a welding machine, a secondary formed in two parts, a connecting member connected to said parts and separated therefrom between the points of connection to said parts and terminals connected to said parts and movable toward and away from each other, substantially as set forth.

This specification signed and witnessed this 20th day of February, 1913.

JAMES H. GRAVELL.

Witnesses:
WM. J. EARNSHAW,
BRUCE F. ROBLE.